(12) United States Patent
Męczkowski et al.

(10) Patent No.: US 12,504,239 B2
(45) Date of Patent: Dec. 23, 2025

(54) HEAT EXCHANGER CORE LAYER

(71) Applicant: Hamilton Sundstrand Corporation, Charlotte, NC (US)

(72) Inventors: Tomasz Męczkowski, Grajewo (PL); Hubert Siudziński, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 289 days.

(21) Appl. No.: 18/315,106

(22) Filed: May 10, 2023

(65) Prior Publication Data
US 2023/0366640 A1 Nov. 16, 2023

(30) Foreign Application Priority Data
May 11, 2022 (EP) ..................... 22461547

(51) Int. Cl.
*F28F 13/12* (2006.01)
*B33Y 80/00* (2015.01)
*F28F 3/02* (2006.01)
*F28F 3/04* (2006.01)
*B22F 10/28* (2021.01)
*B33Y 10/00* (2015.01)
*F28F 9/02* (2006.01)
*F28F 21/08* (2006.01)

(52) U.S. Cl.
CPC ............. *F28F 3/022* (2013.01); *B33Y 80/00* (2014.12); *F28F 3/044* (2013.01); *B22F 10/28* (2021.01); *B33Y 10/00* (2014.12); *F28F 9/02* (2013.01); *F28F 21/08* (2013.01); *F28F 2250/102* (2013.01); *F28F 2255/00* (2013.01)

(58) Field of Classification Search
CPC .... F28F 3/022; F28F 3/044; F28F 9/02; F28F 21/08; F28F 2250/102; F28F 2255/00; B33Y 80/00; B33Y 10/00; B22F 10/28
USPC ........................................ 165/109.1
See application file for complete search history.

(56) References Cited

U.S. PATENT DOCUMENTS

| | | | |
|---|---|---|---|
| 4,938,280 A * | 7/1990 | Clark | H01L 23/473 257/E23.098 |
| 10,617,035 B2 | 4/2020 | Mayberry et al. | |
| 10,821,509 B2 | 11/2020 | Manteiga et al. | |
| 2007/0131386 A1 | 6/2007 | Tsai | |
| 2017/0356696 A1* | 12/2017 | Zaffetti | F28F 7/02 |
| 2020/0141656 A1 | 5/2020 | Lewandowski et al. | |

FOREIGN PATENT DOCUMENTS

| | | | |
|---|---|---|---|
| CN | 113035392 A * | 6/2021 | |
| CN | 113309578 A | 8/2021 | |
| EP | 3258203 A1 | 12/2017 | |
| WO | 2005033607 A1 | 4/2005 | |

OTHER PUBLICATIONS

Abstract of CN113309578 (A), Published: Aug. 27, 2021, 1 page.
European Search Report for Application No. 22461547.6, mailed Oct. 31, 2022, 6 pages.

* cited by examiner

*Primary Examiner* — Davis D Hwu
(74) *Attorney, Agent, or Firm* — CANTOR COLBURN LLP

(57) ABSTRACT

A pin for a core layer of a heat exchanger, the pin extending from a first pin end to a second pin end and having an outer surface between the first and second pin ends, wherein the pin comprises a plurality of surface features protruding from the outer surface.

9 Claims, 2 Drawing Sheets

HEAT EXCHANGER CORE LAYER

CROSS-REFERENCE TO RELATED APPLICATIONS

This application claims priority to European Patent Application No. 22461547.6 filed May 11, 2022, the entire contents of which is incorporated herein by reference.

TECHNICAL FIELD

The present disclosure relates to a pin for a heat exchanger, a layer for a heat exchanger, a heat exchanger, and a method of making a layer for a heat exchanger.

BACKGROUND

Heat exchangers are used in many fields and exist in many forms. Typically, heat exchangers involve the transfer of heat between a first and a second fluid flowing in adjacent channels or layers of the heat exchanger. Many heat exchanger designs have a flowpath defined between an inlet of the heat exchanger and an outlet of the heat exchanger, and between fluid flow layers separated by plates that extend between the inlet and outlet. Heat exchange to or from a fluid flowing in the flowpath occurs primarily through the plates. It is known to provide pins or fins that extend in the flowpath, between the plates, to improve the heat transfer and create turbulence in the fluid flow. Various pin or fin shapes are known including triangular or rectangular cross-sectional shapes.

Such conventional heat exchangers have generally been considered satisfactory for their intended purpose but there is a need in the art for improved heat exchangers.

SUMMARY

According to a first aspect, there is provided a pin for a core layer of a heat exchanger, the pin extending from a first pin end to a second pin end and having an outer surface between the first and second pin ends, wherein the pin comprises a plurality of surface features protruding from the outer surface.

Also provided is layer for a heat exchanger, the layer comprising: an inlet; an outlet; an upper sheet; a lower sheet; a fluid flowpath defined between the upper sheet and lower sheet and from the inlet to the outlet; and at least one pin disposed in the flowpath and connecting the upper sheet to the lower sheet; wherein the pin has a first pin end and a second pin end and an outer surface between the first and second pin ends, wherein the pin includes a plurality of surface features protruding from the outer surface.

Defining a fluid flowpath between upper and lower sheets where the fluid flows past pins formed with such surface features such as bumps or other protrusions on its outer surface greatly increases the turbulence of the fluid flow in the flowpath. By increasing the turbulence of the fluid flow, the heat transfer of the heat exchanger layer is increased. Furthermore, the surface features on the pins result in the pins having an increased primary heat transfer area compared to conventional/smooth pins.

The layer may comprise a plurality of such pins disposed in the flowpath, each pin connecting between the upper sheet and lower sheet and having a pin height defined between the upper and lower sheet.

At least one of the upper sheet and the lower sheet may be formed from an aluminium alloy, a titanium alloy, an austenitic nickel-chromium-based superalloy, stainless steel or copper.

According to another aspect, there is provided a heat exchanger comprising a first layer and a second layer; wherein the first layer is a layer according to the preceding aspect; wherein the second layer is a layer according to the preceding aspect; and wherein the upper sheet of the second layer is also the lower sheet of the first layer.

The average distance between the upper and lower sheets of the first layer may be different from the average distance between the upper and lower sheets of the second layer. Put another way, the first layer may have a different average height from the second layer. The number of pins disposed in the flowpath of the first layer may be different from the number of pins disposed in the flowpath of the second layer.

A pin pattern of the pin(s) disposed in the flowpath of the first layer may be different from a pin pattern of the pin(s) disposed in the flowpath of the second layer.

According to another aspect, there is provided a method of manufacturing a layer for a heat exchanger, the method comprising: forming a lower; additively manufacturing at least one pin on the lower sheet, the pin having a first pin end and a second pin end and an outer surface between the first and second pin end and further having surface features formed on and protruding from the outer surface; and providing an upper sheet on top of the pin.

Using additive manufacturing allows pins to be created having the surface features on their outer surface. The method may comprise additively manufacturing a plurality of pins on the lower sheet.

The method may comprise providing a sidewall extending between the lower sheet and the upper sheet; and optionally additively manufacturing one or more sets of turning vanes on the lower sheet at the same time as additively manufacturing the or each pin.

Additively manufacturing the sidewall may be simpler than using traditional manufacturing techniques. Turning vanes may be desirable in layers having a non-straight flow path, e.g. a U-shaped flow path, and additively manufacturing these may be simpler than using traditional (non-additive) manufacturing techniques.

In an example, the sheets may also be manufactured using additive manufacture.

Each step of additive manufacturing may be performed using a metal powder bed SLM additive manufacturing process, or other AM methods.

A powder of the metal powder bed may be one of an aluminium alloy, a titanium alloy, and an austenitic nickel-chromium-based superalloy.

SLM is a relatively mature additive-manufacturing technology and typically allows recovery of unused (i.e. unmelted) powder from the finished article. The unused powder may be used in future additive-manufacturing operations and thus this method may be cost effective by minimizing wastage of (potentially expensive) metal powder.

The heat exchanger constructed in accordance with this aspect may have a compact design allowing for good heat exchange between fluids flowing in their respective pluralities of layers.

BRIEF DESCRIPTION OF THE FIGURES

Certain embodiments of the present disclosure will now be described in greater detail by way of example only and with reference to the accompanying drawings in which.

DETAILED DESCRIPTION

Figure 1:
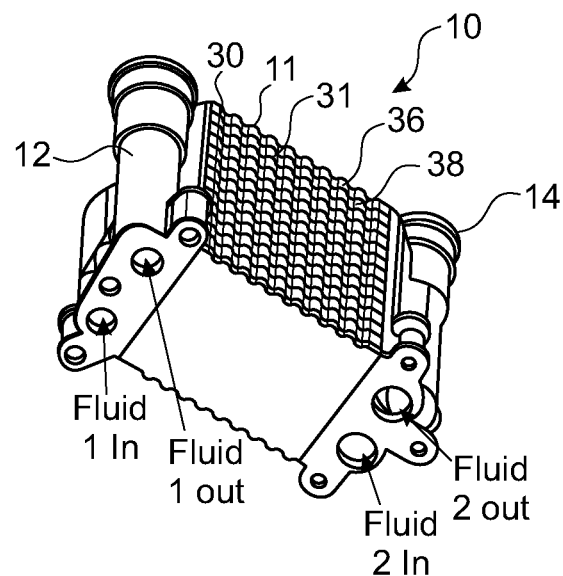
FIG. 1 shows a perspective view of a heat exchanger.

FIG. 1 shows a heat exchanger 10 having a heat exchanger core 11, a first header 12 for conveying a first fluid e.g. oil into and out of the core 11, and a second header 14 for conveying a second fluid e.g. oil into and out of the core 11. The heat exchanger may be primarily used to exchange heat between the first fluid and the second fluid. However, heat may also be exchanged out through the sidewall 40 as well as out of the top and bottom sides of the heat exchanger core 11. The first and second fluids may be oil—in an oil-oil cooler (OOC), but other fluids, including water or air may also be used.

Figure 2:
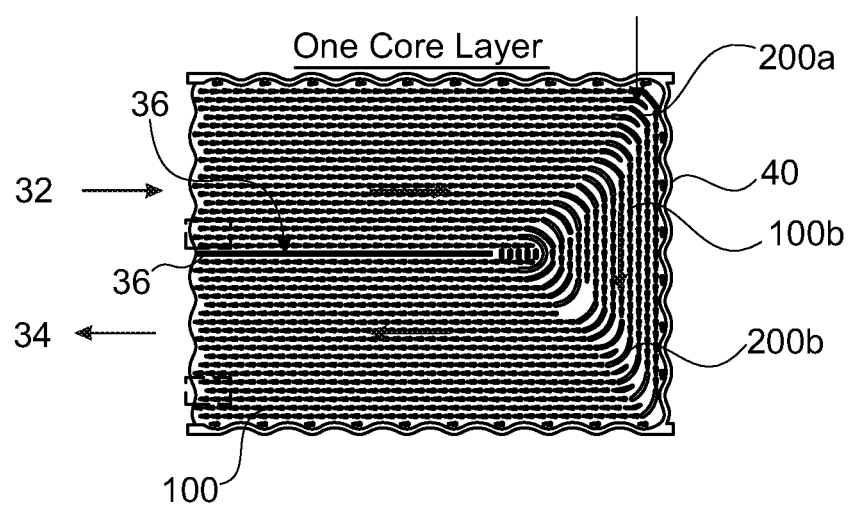
FIG. 2 shows a plan view of a layer within the heat exchanger.

The first header 12 connects to a first plurality of layers 30 of the heat exchanger core 11. The second header 14 connects to a second plurality of layers 31 of the heat exchanger core 11. The first plurality of layers 30 is interleaved with the second plurality of layers 31 so that the first fluid flows through every second layer and the second fluid flows through the layers in-between the first fluid layers, providing alternate layers of first fluid flow and second fluid flow. The individual layers are typically rotated 180 degrees relative to each other. At least within the heat exchanger 10, the first fluid flowing in the first plurality of layers 30 is fluidly isolated from the second fluid flowing in the second plurality of layers by the sheets separating the layers. FIG. 2 shows one core layer. Any layer of the first and second pluralities of layers may be a layer 30 as shown in FIG. 2.

As shown in FIG. 2, the layer 30 comprises an inlet 32 and an outlet 34, a sidewall 40, and (not shown in FIG. 2) an upper sheet, and a lower sheet 38. In use, fluid is constrained by the upper sheet, lower sheet 38, and sidewall 40, so as to flow from the inlet 32, through the layer 30, to the outlet 34. That is, the upper sheet, lower sheet 38, and sidewall 40 together define a flowpath for fluid flowing in the layer 30. The layer 30 shown in FIG. 2 defines a generally U-shaped flowpath between the inlet 32 and outlet 34, with the inward flow separated from the outward flow by a separation bar 36. The upper sheet (not shown) of a given layer, may simultaneously function as the lower sheet 38 of layer (e.g. layer 30) immediately above.

With reference to FIG. 1, a first portion of the first header 12 connects to the inlet side 32 of each layer 30 of the first plurality of layers, and, in use, fluid is pumped into the first portion and flows into the inlet side 32 of every layer connected to the first header 12. The fluid flows through each of the layers 30 and out through the outlet 34 of each layer of the first plurality of layers. The outlets 34 are all connected to a second portion of the first header 12, the second portion being fluidly isolated from the first portion. Fluid flows into the second portion and then out of the first header 12.

Similarly, a first portion of the second header 14 connects to the inlet side 32 of each layer 31 and, in use, fluid is pumped into the first portion and flows into the inlet side 32 of every layer connected to the second header 14. The fluid flows through each of the layers 31 and out through the outlet 34 of each layer. The outlets 34 are all connected to the second portion of the second header 14, the second portion being fluidly isolated from the first portion. Fluid flows into the second portion and then out of the second header 14.

Figure 3:
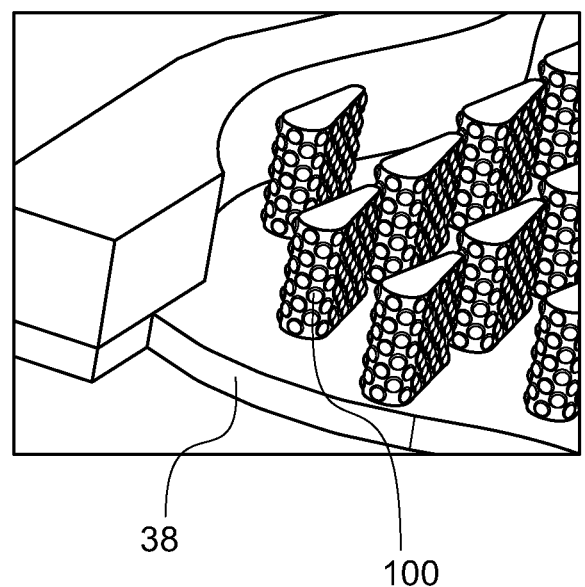
FIG. 3 shows a detailed view of pins according to the disclosure in the heat exchanger.

Within each layer 30, as shown in FIG. 3, one or more pins 100 are disposed in the fluid flowpath. Each pin 100 extends between the lower sheet 38 and the upper sheet (not shown in FIG. 3).

Additionally, there may be provided within each layer 30 a first set of turning vanes 200a that may turn the flow through 90 degrees, and a second set of turning vanes 200b that may turn the flow through a further 90 degrees, to create the overall U-shaped flow path. A plurality of pins 100b may be disposed between the first and second sets of turning vanes 200a, b. The pins 100 shown in FIG. 4 are all arranged within the layer 30 such that each pin 100 faces directly into a local flow direction.

FIG. 3 shows the shape of the pins 100, 100b in more detail. In the direction from the lower sheet to the upper sheet or vice versa, the pins have pin body 101 extending between a first end 110 and a second end 120. The cross section of the pin 100, in the plane across the ends 110, 120 may take a variety of shapes e.g. triangular, rectangular, teardrop shaped, oval, circular, etc. The ability to manufacture the pins using additive manufacturing means that there is much more flexibility in the shapes that can be produced. The cross-section in the example shown is a teardrop or rounded triangle shape such that the width of the pin tapers in the direction of fluid flow.

Figure 4:
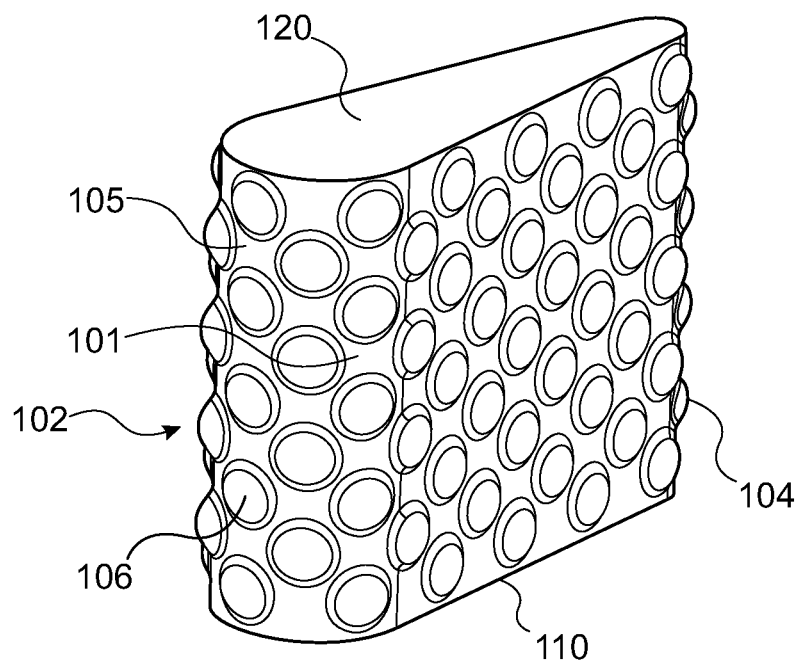
FIG. 4 shows a single pin of the type according to the disclosure.

FIG. 4 shows the shape of a pin 100 of a pin according to the disclosure. The pin has a leading edge 102 facing the fluid flow towards the pin, and a trailing edge 104, a first end 110 and a second end 120. The cross-sectional shape of the pin of this example is shown as a teardrop of rounded triangle shape such that the width of the pin tapers from the leading edge 102 to the trailing edge 104. This is just one example, and the pin can have other cross-sections.

The body of the pin has an outer surface 105 between the first and second ends. A plurality of surface features 106 such as bumps or ridges or other protrusions are provided on the outer surface 105 extending out from the outer surface. These surface features create turbulence in the fluid flow thus leading to improved thermal exchange. The fluid is directed towards the pin 100 in a first direction. As it meets the pin at the leading edge 102 it is deflected as it flows around the pin in different directions due to the surface features. The surface features disturb the flow of the fluid causing a permanent disturbance of the velocity field, which results in intensive mixing of the fluid particles making the fluid more turbulent. This turbulence is magnified due to the plurality of pins in the layer. The increased turbulence increases the heat transfer coefficient and, thereby, the efficiency of the heat exchanger. Further, the surface features increase the surface area, and hence the heat transfer area, of the pin compared to conventional pins which have a smooth outer surface.

In a heat exchanger core, as described above, several such layers will be provided, separated by the sheets. FIG. 2 shows just one such layer but the principle will be the same for each layer.

It is possible that the number of pins and/or the pattern in which the pins are arranged is the same for each layer, but it is also feasible that different layers have different numbers of pins and/or patterns of pins. The layers may also be the same height (defined between the sheets) or different layers may have different heights depending on the application.

Any or all parts of the heat exchanger 10 other than the pins may be made from metal. In some embodiments, some or all parts are made from an austenitic nickel-chromium-based superalloy, such as the Inconel family of metals manufactured by the Special Metals Corporation of New York state, USA. In other embodiments, some or all parts may be made from an aluminium alloy, a titanium alloy, stainless steel or copper.

The first and second fluids may be oil, such that the heat exchanger 10 is an oil-oil heat exchanger. However, in other embodiments, the first fluid may be different from the second fluid. Other fluids, including air, water, fuel(s), or carbon dioxide are also envisaged for either or both of the first and second fluids.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A layer for a heat exchanger, the layer comprising:
   an inlet;
   an outlet;
   an upper sheet;
   a lower sheet;
   a fluid flowpath defined between the upper sheet and lower sheet and from the inlet to the outlet; and
   a plurality of pins disposed in the flowpath and connecting the upper sheet to the lower sheet, wherein each pin includes having a first and a second end and an outer surface between the first and second ends, and wherein a plurality of surface features are provided on and protruding from the outer surface;
   wherein the layer defines an inflow path from the inlet, and an outflow path to the outlet, the inflow path and the outflow path being separated in the layer by a separation bar, the inflow path and the outflow path each having a plurality of said pins, the layer further comprising a plurality of turning vanes to turn the direction of flow from the inflow path by substantially 180 degrees to the outflow path.

2. The layer according to claim 1, wherein pin has a cross-section that tapers from an inlet side of the pin to an outlet side of the pin.

3. The layer according to claim 2, wherein the cross-section is a rounded triangular shape.

4. The layer of claim 1, wherein the plurality of turning vanes includes a first plurality of vanes to turn the direction of flow from the inflow path by substantially 90 degrees and a second plurality of turning vanes to turn the direction of flow by a further 90 degrees to the outflow path.

5. A heat exchanger comprising a first layer and a second layer;
   wherein the first layer is a layer according to claim 4; and
   wherein the upper sheet of the second layer is also the lower sheet of the first layer.

6. The heat exchanger according to claim 5, wherein the number of pins disposed in the flowpath of the first layer is different from the number of pins disposed in the flowpath of the second layer.

7. A method of manufacturing a heat exchanger, the method comprising:
   manufacturing a first plurality of layers interleaved with a second plurality of layers, wherein each layer of the first and second pluralities of layers is a layer according to claim 1;
   manufacturing a first header fluidly connected to each of the first plurality of layers; and
   manufacturing a second header fluidly connected to each of the second plurality of layers.

8. The method according to claim 7, wherein each step of manufacturing the first and second pluralities of layers is performed using a metal powder bed SLM additive manufacturing process or other additive manufacturing process.

9. The method of claim 8, wherein a powder of the metal powder bed is one of an aluminium alloy, a titanium alloy, an austenitic nickel-chromium-based superalloy, stainless steel or copper.

* * * * *